Patented July 13, 1937

2,086,997

UNITED STATES PATENT OFFICE 2,086,997

PROCESSING PIGMENT DISPERSIONS

Emile C. de Stubner, New York, N. Y.

No Drawing. Application June 9, 1934,
Serial No. 729,913

8 Claims. (Cl. 134—58)

The present invention relates to the utilization of sogasoids in the formation of disperse systems in which finely divided solids are uniformly dispersed in a selected dispersion medium. The dispersion medium may be a gas, a vapor, a liquid, a solid or a plastic substance, or it may be a mixture of any or all of them. Also, it may be a mixture of a dispersion medium in any of its own phases or in a mixture of the phases. For example, a dispersion medium such as camphor can well serve in three phases, i. e. as solid, as liquid and as vapor. This is true particularly during the modification of one phase into the other in either direction. If solid camphor is first melted into its liquid phase, it in turn may be modified into the gas or vapor phase and the latter condensed into the liquid phase and finally settling into a solid. This is an example of the maxim "Natura non saltat", nature makes no jumps.

The present invention has for its object the utilization of sogasoids to form intermediary dispersoids, the dispersion medium of which is a part or is compatible or is a constituent of the end product in which the finely divided solids, i. e. the disperse phase (the solids) of the intermediary dispersoid, are to be incorporated.

In my prior and co-pending application, Serial 590,319, filed February 1, 1932 (now United States Letters Patent No. 1,965,764), I have disclosed processes for the production of disperse systems in which the finely divided solids are initially dispersed in an aqueous dispersion medium and are thereafter transferred to an organic medium either by (a) admixing the initial aqueous dispersion and the organic medium, and thereafter distilling off the aqueous medium, or by (b) creating, converting and breaking emulsions formed by the two immiscible liquids comprising the dispersion medium, or by (c) heating the organic dispersion medium and adding the aqueous dispersion of the solids thereto at such a rate as to vaporize the aqueous medium upon contact therewith.

In another of my prior and co-pending applications, i. e. Serial 579,662, I have disclosed processes for the production of dispersoids in which finely divided solids constitute the disperse phase dispersed in non-aqueous dispersion media. In my United States Patent No. 1,955,738, applied for January 18, 1929, under Serial 333,523 I have disclosed and claimed processes for the utilization and conversion of aqueous mixtures of pigments as finely divided solids into organic dispersoids in which the pigments constitute the disperse phase.

Depending upon the characteristics of the finely divided solids as well as the dispersion medium, dispersoids, whether aqueous or non-aqueous, are obtained with more or less efforts and my processes and methods as disclosed in aforesaid applications and patent enable the dispersion expert to choose the more economical route and technically least resisting way when making compositions.

In the processes disclosed and claimed in my said co-pending applications and patent, the finely divided solids such as pigments are prepared in a liquid initial intermediary dispersion medium, which is thereafter displaced by a final or ultimate displacing or replacing medium.

The present invention utilizes so-called "sogasoids" which are systems consisting of a solid phase suspended in a gaseous or vapor phase or medium, as defined in Hackh's Chemical Dictionary. Examples of sogasoids are dry powders and dusts or smokes where gases or vapors are retained by fine solid particles through the force of adsorption. Commercial carbon black, lamp black, acetylene black, bone black, zinc oxide, are a few of such sogasoids. Cabot states that "carbon black may occupy only five percent of its own apparent volume, the rest being adsorbed air and air free to move between particles". The affinity between gases or vapors and finely divided or porous solids is very great. One only needs to consider the attraction for poisonous or other gases by the activated carbon particles in gas masks. Lamb and Coolidge, who carried out measurements, have estimated that adsorbed gases may be under a pressure of many thousand atmospheres.

I propose to utilize such sogasoids to facilitate the incorporation of finely divided solids such as abrasives, fillers, colors, pigments, lakes and the like into vehicles such as oils, resins, waxes, cellulose, cellulose compounds, and rubber, or solutions of emulsions thereof to form products useful in the manufacture of or as adhesives, insecticides, leather, leather finishes, artificial leather, printing ink, soap, candles, cosmetics, varnishes, varnish stains, oil stains, putties, wood finishes, metal finishes, flatting compounds, floor wax, sealing wax, coating compounds, plastics, thermo-plastics, lubricants, rubber goods, tires, paint, paint-enamels, celluloid, lacquer, photographic films, oilcloth, linoleum, etc. For convenience, all of said products will be hereinafter referred to as "consumer products".

In the specific instance of dispersing pigment as finely divided solids in a suitable medium for plastic or coating compositions, it is common practice to grind the pigment particles before attempting to incorporate such particles in the dispersion medium and thereafter to grind both pigment and dispersion medium to accomplish the dispersion of the pigment particles in the vehicle. In either case, the grinding may affect the unground color of the pigment. Also, it has been found that the grinding of the pigment in the vehicle does not result in creating a stable dispersion of the pigment particles in the vehicle or a dispersion which even under ideal conditions is as uniform as is desired for many purposes. By the processes of my present invention I obtain uniform and stable dispersions of pigment particles in the vehicle with a greater degree of uniformity than has heretofore been possible to achieve. In the present process I first disperse the pigment particles in a gas or vapor, and in so doing I eliminate the necessity for grinding of the pigment in and into the vehicle. In some instances I may use a ground pigment or may even preparatively grind the pigment, so that the invention, while making possible the use of an unground pigment, is not limited thereto.

Further and additional objects of my invention will more readily appear in the perusal of my specifications and examples. Aside from the economical advantages over present methods, I desire to emphasize that the merits of my invention are reflected by the excellent quality of products when made in accordance with my teachings and that they derive their distinctive pleasing appearance and superior effectiveness from the uniformity and evenness of the nature and characteristics of their initial intermediate dispersion. This mark of uniformity of appearance and superior effectiveness which distinguishes the individual batch or run is again reflected in any number of successive batches or runs which in their turn prove that variations in manufacture may be eliminated by my teachings which exclude the human element by depending upon the physical or chemical constants of the components utilized in processes and apparatus as disclosed.

The quality of the above enumerated products depends largely also upon complete saturation of the incorporated solids by and with the compounding element which thus facilitates their even distribution in the end or consumer products. Since it is technically far easier and more economical to obtain finely divided solids completely saturated, impregnated or surrounded with a gaseous medium such as vapors than it is to saturate them by impregnation with oil or viscous or plastic vehicles after they (the solids) have been dried, i. e., in the form of dry powders, I have therefore chosen and desire to employ these solids dispersed in a gaseous medium such as steam or vapor or air, etc., in contravention of present manufacturing processes.

Certain pigments, for example carbon blacks, result from the partial combustion of a gas. In their dry state such pigments exist in a dispersed condition in the gaseous products of combustion or air. Such a disperse system may consist of finely divided solids having gas as the dispersion medium, and also the dispersing agent can be a gas, e. g. ammonia, carbon dioxide, carbon monoxide, sulphurous acid, or the vapor of pyridine, alcohol, toluene, water, azeotropic mixtures, acetylene, acetic acid, etc. Such disperse systems, when formed with a liquid dispersion medium, are similar physically to foams, lather, froth, or sprays, while if formed with a gas as a dispersion medium are similar physically to smokes or mists. For example, commercial carbon black is a disperse system of a solid in a gas, i. e. solid carbon particles are dispersed in an atmosphere of air, carbon dioxide and carbon monoxide, which gases are formed during the combustion of natural or other hydrocarbonaceous gases for the manufacture of carbon blacks, lamp blacks, acetylene blacks, and similar commercial varieties of carbon, such gases being retained by adsorption in the carbon particles. To make a dispersion of carbon black in water or otherwise produce disperse systems of carbon black and a liquid, either aqueous or non-aqueous, requires dispersing agents. Such agents also may consist of gases or vapors, such for example as ammonia gas or pyridine vapor or vapors of the organic amines.

By the process embodying the present invention I utilize gaseous dispersions of solid particles and extend such dispersions by adding more of the gaseous dispersion medium thereto, which has the effect of diluting such dispersoids. I have discovered that the so-called "dry" pigments existing as powders, or fine dust particles, may be considered as "dispersed" in air. To such "dispersions" I add more air to extend or dilute this initial dispersion to a predetermined point. I thereafter "deflate" the gaseous dispersion by use of a replacing or displacing medium which is compatible with the dispersion medium of the end product.

I shall now illustrate processes embodying my invention by way of several examples thereof.

*Example I*

*Production of carbon black pulp.*—In a closed barrel which is provided with an open inlet for steam under low pressure, are placed fifty pounds of commercial carbon black or lamp black. In the barrel is preferably inserted a heating coil through which steam circulates in order to obtain a temperature in the barrel sufficiently high to prevent excessive condensation when open steam is let in. A suitable quantity of ammonia in the form of ammonia-water or as gas or salts from which ammonia may become liberated is placed in the barrel. The steam inlet is then opened, and steam is blown into the barrel. After a short time it will be noticed that the volume which was occupied by the dry carbon black is considerably reduced and the carbon black is wetted and forms a pulp in which the solid particles are dispersed in a portion of the condensed steam and aqueous ammonia. The vapor pressure of the ammonia is used to facilitate the wetting process and contributes directly to the obtaining of the carbon black in the form of a pulp. In place of the ammonia and steam, pyridine vapors may be used, in which event after condensation of the pyridine gas, the resulting pulp consists of carbon black dispersed in pyridine as the pulping medium. The gaseous initial dispersion medium of the commercial carbon black has been replaced and displaced in one case by water and ammonia vapors and in the other case by the pyridine vapors in a very effective manner. Merely soaking commercial carbon black in liquid water or liquid pyridine will not have this effect because of the difference in volume between the liquid phase and the gaseous or vapor phase of pyridine.

The present invention thus utilizes the great affinity of finely divided substances for gases or vapors to effect dispersion of such solids in selected media.

Phosphorous pentoxide is a very hygroscopic substance, i. e. it draws moisture out of moist air and is therefore used in desiccators. Phosphorous pentoxide, however, in form of smoke, i. e. when dispersed in air, passes through water. This is due to the film of air being so strongly adsorbed that the water cannot reach the phosphorous pentoxide. Thus in the process of the present invention, I may utilize phosphorous pentoxide dispersed in air in place of the ammonia and steam or the pyridine vapors of the example. Here we have a similar situation as in the case of emulsions. We have emulsions of the water-in-oil type and the oil-in-water type. A dyestuff very soluble in water cannot color an emulsion of the water-in-oil type because the dye does not reach the water to become dissolved because the water is protected by the oil particles. In the phosphorous pentoxide and water example, the air is on the outside like a coat, thus preventing the water from dissolving the phosphorous pentoxide. According to the laws of physics. gases are completely miscible in and with each other. The laws of vapors are somewhat similar to the gas laws in this respect and for this reason the vapors of the pyridine in this example mix perfectly with the adsorbed gas film around the carbon particles, and when condensation of the pyridine vapors into the liquid phase takes place the air escapes and the liquid pyridine can reach the exposed carbon particle to completely wet it and thus forms a pulp or the intermediary dispersoid ready for conversion into the final and ultimate end or consumer product. In the case of phosphorous pentoxide the adsorbed air film would be violently liberated by adding the water in the vapor phase, i. e. steaming it.

The black pulp resulting from the example above may be further processed by my processes disclosed in applications Serials 590,319, (now United States Letters Patent No. 1,965,764), 579,-662, or my United States Patent 1,955,738. Such a pulp of fifty pounds water and twenty-five pounds carbon black, may, for example, be placed into a kneading machine with twenty-five pounds of alkali-cellulose and worked into a pulp having carbon black and alkali-cellulose as solid components and water for the pulping medium. At this stage the entire mass shows an alkali reaction because of the partial dissociation of the alkali-cellulose in water. The resultant dispersion is particularly adapted to color paper pulp to make black or gray paper without risking contamination of the beater room or the entire mill with carbon black dust as when using carbon black in the form of dry powder.

*Example II*

*Production of colored xanthates.*—Place the above described pulp into a closed and tight kneading machine of the type described in my co-pending application Serial 590,319 (now United States Letters Patent No. 1,965,764), and while kneading blades are kept going add five hundred cubic centimeters of carbon bi-sulphide. The alkali-cellulose in the pulp is thereby transformed into the xanthate which, with the requisite amount of alkaline water, will form a smooth paste, in this case colored black with carbon black.

I have found that such a pulp or paste serves very well to color rubber latex.

While I have cited specifically the use of zinc oxide or carbon blacks, any alkali resistant pigment such as ultra-marine, chrome-oxide, sulphur dyes, vat dyes, a large group of diazo colors, may be used in place thereof to give the desired color to the finished product.

From the foregoing it becomes clear that the gaseous dispersoids or the sogasoids of this invention are very voluminous. This quality is not troublesome when such sogasoids need not be shipped but are further processed where manufactured. Carbon black makers, in order to reduce the normal volume of carbon black resulting from combustion processes, reduce this volume by compression. When such compressed blacks are to be incorporated into end products, the compounder complains about the increased difficulties he has to overcome when attempting to disperse compressed blacks in the final composition.

*Example III*

*Method of obtaining a "carbon black rubber pulp" with toluene as the pulping medium.*—Fifty pounds of commercial carbon black are by means of an air blower (Connersville type) moved and circulated in a closed tank of three hundred gallon capacity. Also in this case a quantity of ammonia gas (ten pounds) will promote the air dispersion of the pigment. In a closed tank of one hundred gallon capacity, of upright cylindrical shape like a hot-water tank, place four hundred fifty pounds of a three percent rubber cement and agitate by means of a high-speed mixer of the propeller type. The contents of the three hundred gallon tank, i. e. the sogasoid of fifty pounds carbon black, are now blown through this rubber cement. The air escapes through the opening of the one hundred gallon tank which is connected with a condenser to recover some toluene vapors carried along by the escaping air. The diluted commercial carbon black (diluted with air) is trapped in the rubber cement with which it forms the intermediary dispersoid, which now may be converted into the ultimate end product by the method disclosed in my co-pending application Serial 579,662.

In place of rubber I may use gutta-percha, nitrocellulose or a xanthate solution or rubber latex, which latter is protected from coagulation by the ammonia contents which served as dispersing agents when the carbon black was circulated with air in the three hundred gallon tank.

It will be observed that these sogasoids function only as an intermediary dispersoid for they cannot serve permanently. One only needs to think of the smoke screens laid by a battleship or an airplane to see that such dispersoids are unstable and of comparatively short duration.

In the processes disclosed in my aforesaid applications and patent it will be observed that during the distillation processes therein disclosed, gaseous or vapor dispersions of this present application may be formed. Before the vapors in these processes reach the condenser they of course fill all the available space in the apparatus and consequently during this period there are dispersions formed of finely divided solids dispersed in the vapor atmosphere of the apparatus, but also in this case such dispersions are only of intermediary character for the very object of the process is to remove the vapors and replace them with a replacing medium. Nevertheless, during the replacing process gaseous disperse systems are formed, the gaseous or vapor phase of which may be the vapors of alcohol, water, toluene, solvent naphtha, azeotropic mixtures, pyridine, acetic acid, organic amines, etc.

I claim:

1. A process for producing a dispersion of carbon black in a dispersion medium liquid under normal atmospheric temperature and pressure, which comprises dispersing the carbon black in its dry state in gaseous ammonia and steam, and thereafter condensing the ammonia and steam to the liquid phase whereby the carbon black is dispersed in and wetted by the admixed ammonia and water solution as the dispersion medium.

2. A process for producing a dispersion of carbon black in a liquid dispersion medium which comprises dispersing the carbon black in its dry state in gaseous pyridine, and thereafter condensing the pyridine to the liquid phase whereby the carbon black is dispersed in and wetted by the pyridine solution as the dispersion medium.

3. A method of processing carbon black to reduce its bulk and facilitate its incorporation into selected dispersion media which comprises dispersing carbon black in its dry state to form a sogasoid in which the carbon black is the dispersed solid and in which a vapor of a medium liquid under normal conditions of temperature and pressure and compatible with and obtaining as a part of the selected dispersion medium is the suspension medium, and thereafter condensing the vapor to its liquid phase whereby the bulk of the carbon black in the sogasoid is reduced and the carbon black particles are dispersed in and wetted by the condensed liquid.

4. A process for dispersing finely divided solids in selected media effective to wet said finely divided solids, which comprises forming an initial dispersion of the solids in their finely divided solid forms by subjecting the solids to agitation in the selected medium in its vapor phase to increase the bulk of the mass and the dispersion of the solids in the vapors of said medium, and thereafter reducing the bulk of the dispersion by condensing the dispersion medium to form a liquid dispersion medium in which the finely divided solids are dispersed and wetted.

5. A process for stabilizing dispersions of finely divided solids, which comprises forming an initial sogasoid comprising the finely divided solids as the disperse phase and a suspension medium maintained in its vapor phase, said suspension medium existing normally as a liquid at atmospheric temperatures and pressures and possessing the property of wetting said finely divided solids, and thereafter condensing the vapor phase of the suspension medium, whereby the initial sogasoid is reduced in bulk, the finely divided solids are wetted thereby and the dispersion of the finely divided solids therein is stabilized.

6. A process for dispersing finely divided solids in a liquid medium capable of acting as a dispersion medium for the finely divided solids, which comprises the steps of dispersing a suitable quantity of the finely divided solids in a gaseous dispersion medium, thereafter displacing the gaseous dispersion medium with the vapors of the said liquid medium, and thereafter condensing said vapors to disperse the finely divided solids in said medium in its liquid phase.

7. A process for dispersing finely divided solids in liquid media acting as a dispersion medium therefor, which comprises dispersing a suitable quantity of the finely divided solids in the vapors of a selected dispersion medium which exists as a liquid at normal atmospheric temperatures and pressures, and thereafter stabilizing the formed dispersion by condensation of the vapor phase of the dispersion medium and its conversion to the liquid phase in which the finely divided solids are dispersed.

8. A process for dispersing finely divided solids in a dispersion medium capable of wetting said solids, the process comprising the steps of dispersing finely divided solids in a gaseous dispersion medium to form a sogasoid, and thereafter replacing the gaseous medium of the sogasoid with substantially the same volume of vapors of a dispersion medium liquid at atmospheric temperatures and pressures, and thereafter condensing the vapors of said medium to form a liquid body in which the finely divided solids are wetted and dispersed.

EMILE C. DE STUBNER.